United States Patent
Hubner et al.

(10) Patent No.: US 9,936,631 B1
(45) Date of Patent: Apr. 10, 2018

(54) DEVICE AND METHOD FOR DETECTING AND REPORTING SEED PLACEMENT

(71) Applicant: Deere & Company, Moline, IL (US)

(72) Inventors: Cary S. Hubner, Geneseo, IL (US); Michael Rhodes, Moline, IL (US); Mark Underwood, Milan, IL (US); Elijah B. Garner, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/281,682

(22) Filed: Sep. 30, 2016

(51) Int. Cl.
*A01C 7/00* (2006.01)
*A01C 7/20* (2006.01)
*A01C 7/10* (2006.01)

(52) U.S. Cl.
CPC .............. *A01C 7/205* (2013.01); *A01C 7/105* (2013.01)

(58) Field of Classification Search
CPC .................................. A01C 7/205; A01C 7/105
USPC .......................................................... 701/50
See application file for complete search history.

(56) References Cited

U.S. PATENT DOCUMENTS

| | | | |
|---|---|---|---|
| 2,465,660 A | 3/1949 | Phillips | |
| 4,239,010 A * | 12/1980 | Amburn | A01C 7/105 111/903 |
| 5,790,428 A | 8/1998 | Easton et al. | |
| 6,199,000 B1 * | 3/2001 | Keller | A01B 79/005 342/357.52 |
| 6,386,128 B1 * | 5/2002 | Svoboda | A01L 379/005 111/200 |
| 7,430,815 B2 | 10/2008 | Reichhardt | |
| 7,716,905 B2 | 5/2010 | Wilcox et al. | |
| 8,365,679 B2 | 2/2013 | Landphair et al. | |
| 8,418,636 B2 | 4/2013 | Liu et al. | |
| 8,935,986 B2 * | 1/2015 | Blomme | A01O 5/062 111/164 |
| 9,743,578 B2 * | 8/2017 | Blomme | A01B 79/005 |
| 9,801,329 B2 * | 10/2017 | Zielke | A01C 7/10 |
| 9,826,677 B2 * | 11/2017 | Gervais | A01C 7/105 |
| 2003/0009282 A1 * | 1/2003 | Upadhyaya | A01B 79/005 701/409 |
| 2003/0028321 A1 * | 2/2003 | Upadhyaya | A01C 21/005 701/50 |

(Continued)

FOREIGN PATENT DOCUMENTS

| | | |
|---|---|---|
| WO | 2013078328 | 5/2013 |
| WO | 2015/171915 | 11/2015 |

OTHER PUBLICATIONS

Friedlander, "Energy Harvester Rolls to Market Production," brochure (2013) 5 pages, http://www.news.cornell.edu/stories/2013/05/energy-harvester-rolls-market-production accessed Jan. 15.

(Continued)

*Primary Examiner* — Tyler J Lee
(74) *Attorney, Agent, or Firm* — Michael Best & Friedrich LLP

(57) ABSTRACT

A seeding machine includes a main frame and a row unit coupled to the main frame. The row unit has a row unit frame and a seed firmer coupled to the row unit frame. The seeding machine also includes a seed detection sensor coupled to the seed firmer. The seed detection sensor is configured to detect seed position within an open furrow.

19 Claims, 7 Drawing Sheets

(56) References Cited

U.S. PATENT DOCUMENTS

| | | | | |
|---|---|---|---|---|
| 2004/0231575 | A1* | 11/2004 | Wilkerson | A01C 7/06 |
| | | | | 111/127 |
| 2011/0184551 | A1 | 7/2011 | Kowalchuk | |
| 2013/0124055 | A1* | 5/2013 | Baurer | H04L 5/001 |
| | | | | 701/50 |
| 2014/0048002 | A1* | 2/2014 | Grimm | A01C 7/06 |
| | | | | 111/127 |
| 2014/0303854 | A1* | 10/2014 | Zielke | A01C 21/00 |
| | | | | 701/50 |
| 2015/0163992 | A1* | 6/2015 | Anderson | A01B 79/005 |
| | | | | 701/50 |
| 2016/0037709 | A1 | 2/2016 | Sauder et al. | |
| 2016/0165789 | A1* | 6/2016 | Gervais | A01C 7/205 |
| | | | | 700/275 |
| 2016/0360692 | A1* | 12/2016 | McCloskey | A01O 5/068 |

OTHER PUBLICATIONS

ST Microelectronics, "LIS3DH—MEMS Digital Output Motion Sensor Ultra Low-Power High Performance 3-Axes "nano" Accelerometer," website (2017) 6 pages, http://www.st.com/web/catalog/sense_power/FM89/SC444/PF250725.

EP17193589.3 Extended European Search Report dated Dec. 22, 2017 (9 pages).

* cited by examiner

DEVICE AND METHOD FOR DETECTING AND REPORTING SEED PLACEMENT

BACKGROUND

The present disclosure relates to systems and methods for planting seeds, in particular with a row crop planter.

Various factors affect crop yields. Such factors include, for example, seed depth in a furrow, seed spacing in the furrow, soil compaction, soil moisture, soil temperature, tillage condition, soil nutrients, and soil type. A productive crop yield is typically one that grows and emerges uniformly from the soil. Understanding seed population and seed placement characteristics provides valuable information that may be used to generate a productive crop yield. Currently this information is provided from a seed sensor, which detects a seed as the seed is falling or being carried to its final resting place in the furrow. However, the information from the seed sensor only provides a general estimate for a final resting location of the seed in the furrow, and not a precise determination of seed location.

SUMMARY

In one aspect, the disclosure provides a seeding machine that includes a main frame and a row unit coupled to the main frame. The row unit has a row unit frame and a furrow following device coupled to the row unit frame. The seeding machine also includes a seed detection sensor coupled to the furrow following device. The seed detection sensor is configured to detect seed position within an open furrow.

In another aspect, the disclosure provides a seeding machine that includes a main frame and a row unit coupled to the main frame. The row unit has a row unit frame and a seed firmer coupled to the row unit frame. The seeding machine also includes an accelerometer coupled to the row unit. The accelerometer is configured to detect seed position within an open furrow.

In another aspect, the disclosure provides a seeding machine that includes a main frame and a row unit coupled to the main frame. The row unit has a row unit sub-frame and a seed firmer coupled to the row unit sub-frame. The seeding machine also includes a seed detection sensor coupled to the seed firmer, and a controller coupled to the seed detection sensor. The controller is configured to determine seed position at least partially based on one or more signals received from the seed detection sensor. The controller is also configured to issue a warning to an operator of a seed firmer malfunction in response to measurement by the seed detection sensor of an acceleration greater than a predefined level.

In another aspect, the disclosure provides a seeding machine that includes a main frame and a row unit coupled to the main frame. The row unit includes a row unit sub-frame and a seed firmer coupled to the row unit sub-frame, the seed firmer including a chamber, and a cover that covers that chamber. The seeding machine also includes a seed detection sensor coupled to the seed firmer at least partially within the chamber, wherein the seed detection sensor is configured to detect seed position within an open furrow.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
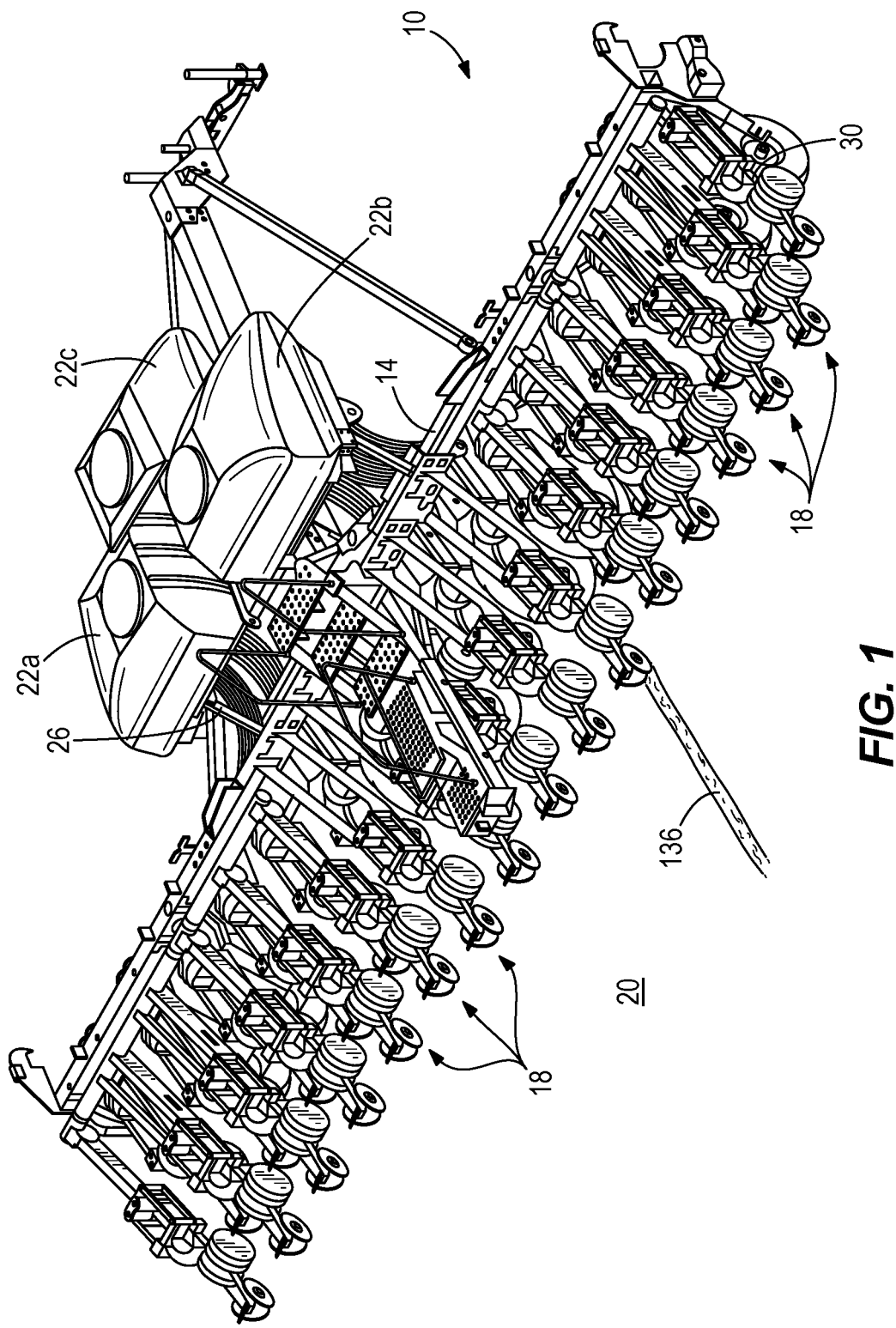
FIG. 1 is a partially schematic perspective view of a seeding machine.

FIG. 1 illustrates a seeding machine 10 (e.g., a row crop planter). The seeding machine 10 includes a main frame 14. A plurality of individual row units 18 are coupled (e.g., mounted) on a rear portion of the main frame 14, such that the row units 18 are pulled over a layer of soil 20. Seed sources, such as storage tanks 22a-22c, are coupled to the main frame 14, and hold seed that is delivered, e.g., pneumatically or in any other suitable manner, to a mini-hopper (not shown) on each row unit 18. The storage tanks 22a-22c are coupled to the mini-hoppers by way of conduits 26, such as hoses, and a pressurized delivery apparatus (not shown). Each storage tank 22a-22c contains the same or different varieties of seed to be planted in the soil 20. Each row unit 18 is connected to a conduit 26 such that each row unit 18 is coupled to a storage tank 22a-22c to receive seed. As illustrated by way of example only in FIG. 1, each row unit 18 further includes its own sub-frame 30, to which various components (e.g., a furrow opener, a furrow closer, etc.) are mounted.

Figure 2:
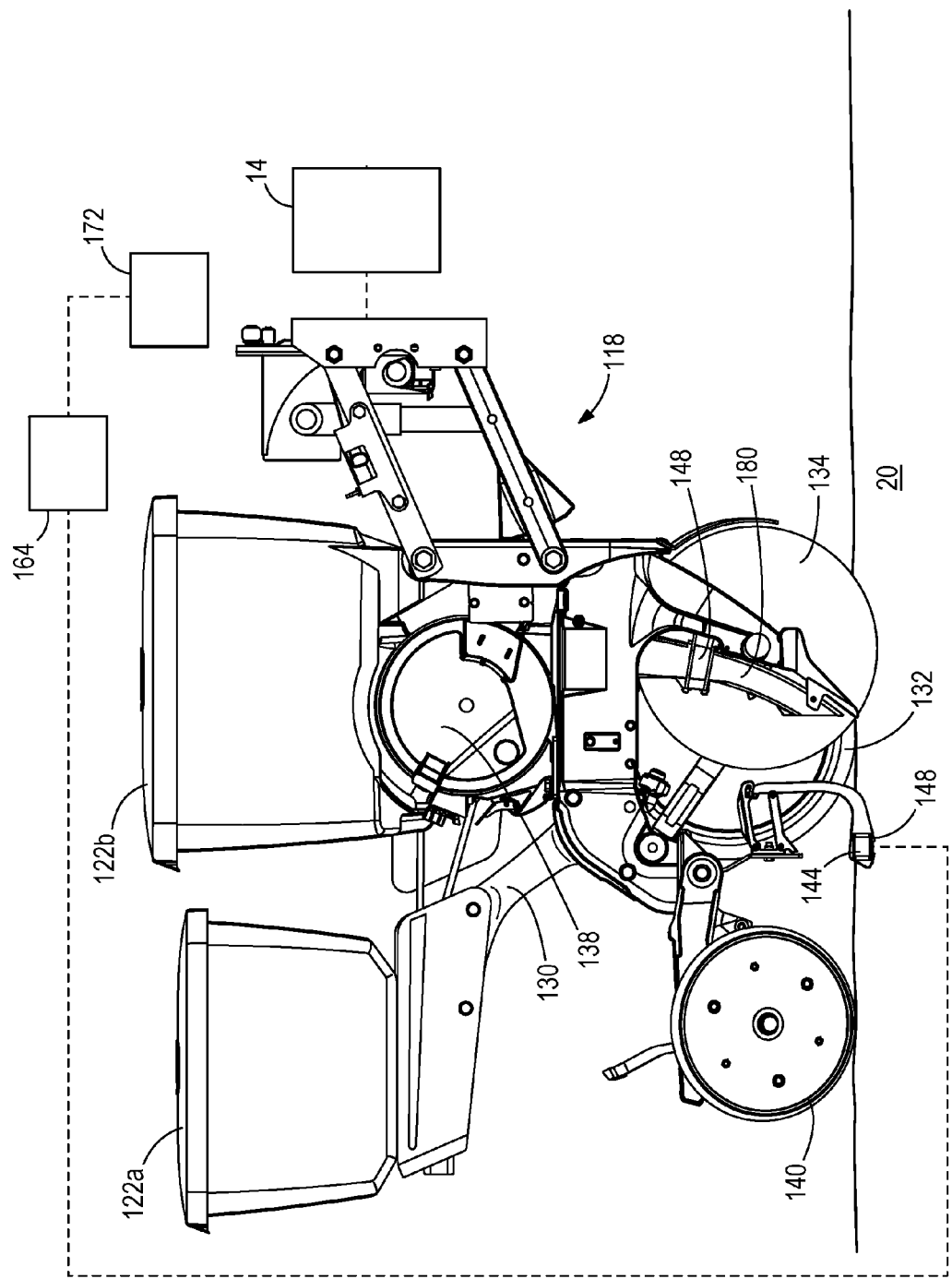
FIG. 2 is a partially schematic side view of a row unit for the seeding machine of FIG. 1, including a seed firmer.

FIG. 2 illustrates an example of a row unit 118 that may be used in place of one of the row units 18 in FIG. 1. Similar to the row unit 18, the row unit 118 is also coupled to the main frame 14. In some constructions, a plurality of row units 118 are coupled to the main frame 14, similar to the row units 18 in FIG. 1.

As illustrated in FIG. 2, each row unit 118 includes its own hoppers 122a, 122b that hold chemical and seed, respectively, as opposed to receiving seed from bulk storage as in the construction illustrated in FIG. 1. The hoppers 122a, 122b are coupled to a row unit sub-frame 130. Each row unit 118 also includes a gauge wheel (or wheels) 132 coupled to the row unit sub-frame 130 that contacts and rolls along the soil 20, and a furrow opener 134 (e.g., an opening wheel or blade or other structure having a stationary or rotating surface that contacts and moves soil away to form a furrow) coupled to the row unit sub-frame 130 for forming a furrow 136 (see FIG. 1) in the soil 20. A seed metering device 138 coupled to the row unit sub-frame 130 receives seeds from the hopper 122b and meters and dispenses the seeds into the furrow 136. A furrow closer 140 (e.g., a closing and packing wheel or wheels or other structure having a stationary or rotating surface that contacts and presses soil 20) coupled to the row unit sub-frame 130 pushes soil around the seeds to close the furrow 136. In the illustrated construction, each row unit 118 also includes a furrow following device 144 coupled to the row unit subframe 130. In the illustrated construction the furrow following device 144 is a seed firmer positioned forward of the furrow closer 140 that firms each seed and pushes it into the open furrow 136. In other constructions the furrow following device 144 may be an in-furrow fertilizer device. Other furrow following devices include a soil sensor carrier.

With continued reference to FIG. 2, each row unit 118 also includes a seed detection sensor 148 that detects seeds within the furrow 136. In the illustrated construction, the seed detection sensor 148 is coupled (e.g., directly coupled) to the furrow following device 144. In some constructions, the seed detection sensor 148 is integrally formed with the furrow following device 144. In other constructions, the seed detection sensor 148 is fixed to the furrow following device 144 (e.g., with adhesive, fasteners, etc.). In other constructions, the seed detection sensor 148 is removably coupled to the furrow following device 144. In some constructions, the seed detection sensor 148 is coupled to (e.g., integrally formed with, fixed to, or removably coupled to) other areas of the row unit 118, including but not limited to the row unit sub-frame 130 or the furrow closer 140. In some constructions, one or more of the row units 118 includes a furrow following device 144 that is coupled to the seed detection sensor 148, but the furrow following device 144 does not actually firm the seed (e.g. is a device that is raised above the open furrow 136 and/or the seeds therein, or that drags along the open furrow 136 but does not actually firm any seeds).

In the illustrated construction, the seed detection sensor 148 detects one or more seeds when the seeds are resting at the bottom of the furrow 136, prior to the furrow 136 being closed by the furrow closer 140. In other constructions the seed detection sensor 148 detects one or more seeds when the seeds are resting at the bottom of the furrow 136, after the furrow 136 has been closed by the furrow closer 140.

Figure 3:
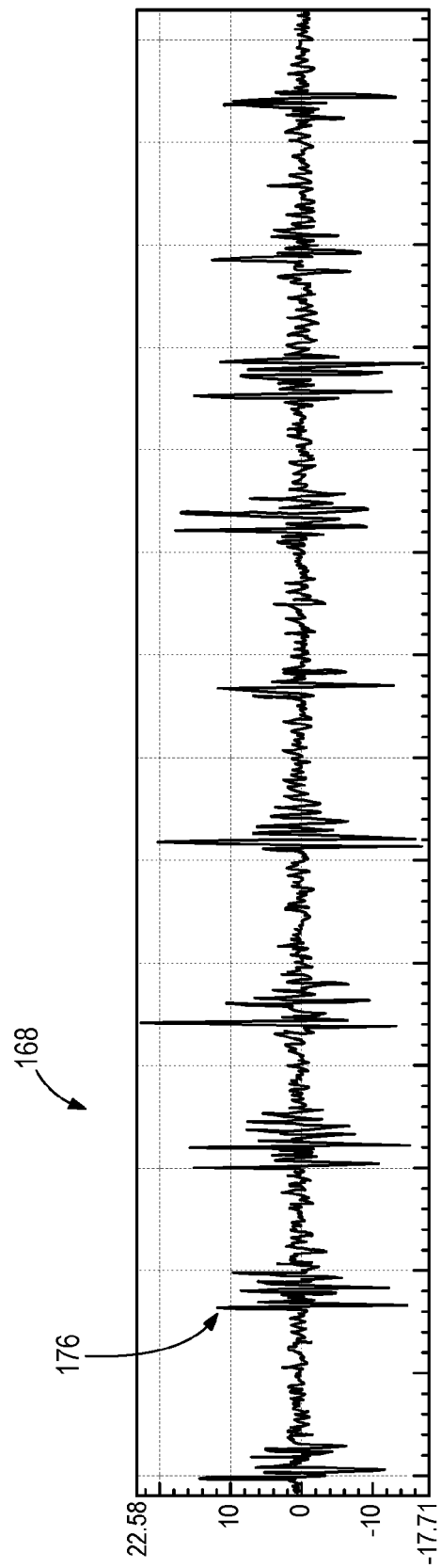
FIG. 3 is a graphical representation of signals received from a seed detection sensor coupled to the row unit of FIG. 2.
Figure 4:
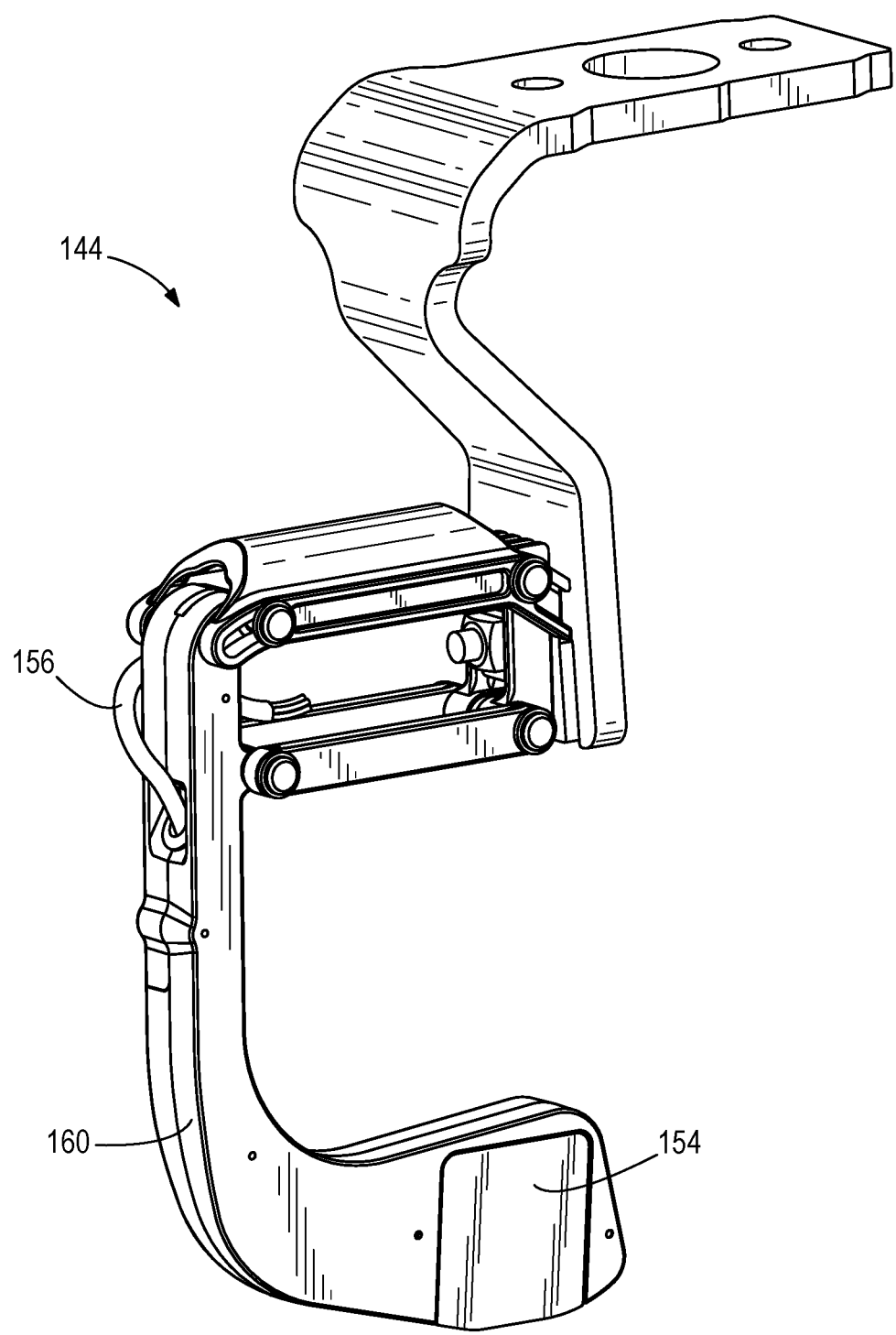
FIG. 4 is a perspective view of the seed firmer, the seed firmer having a chamber that holds the seed detection sensor, and a cover that covers the chamber.
Figure 5:
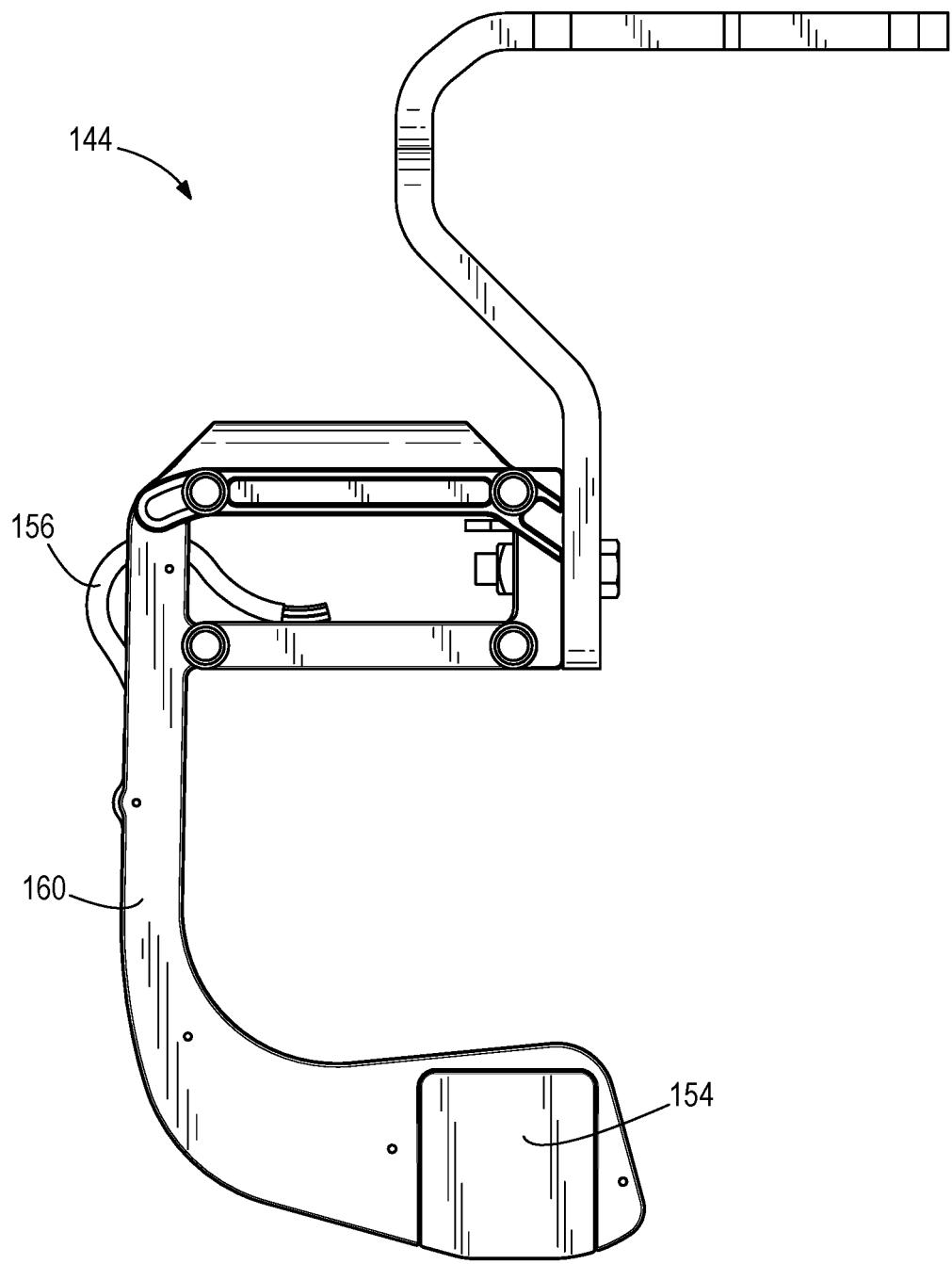
FIG. 5 is a front view of the seed firmer.
Figure 6:
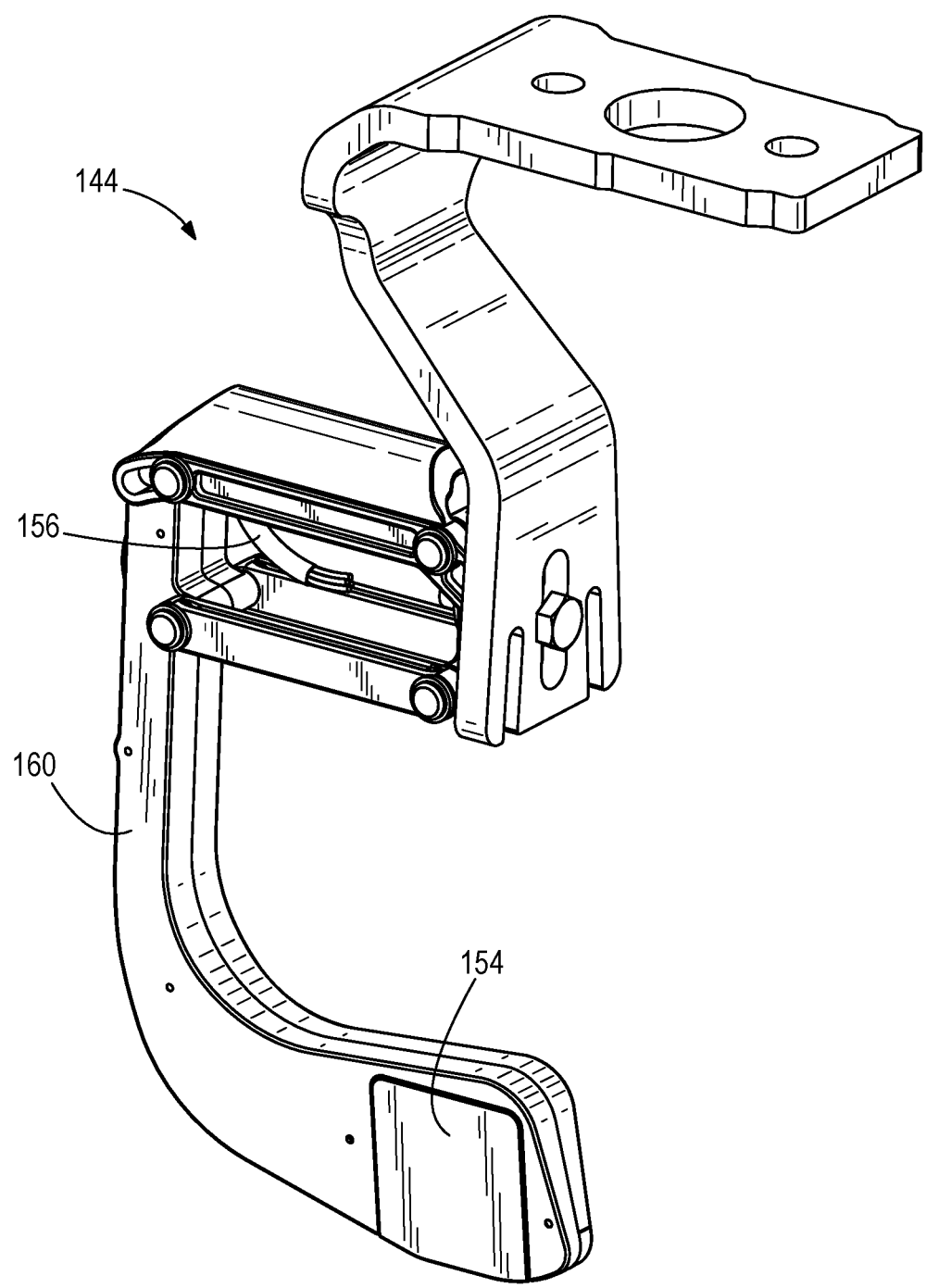
FIG. 6 is a perspective view of the seed firmer.
Figure 7:
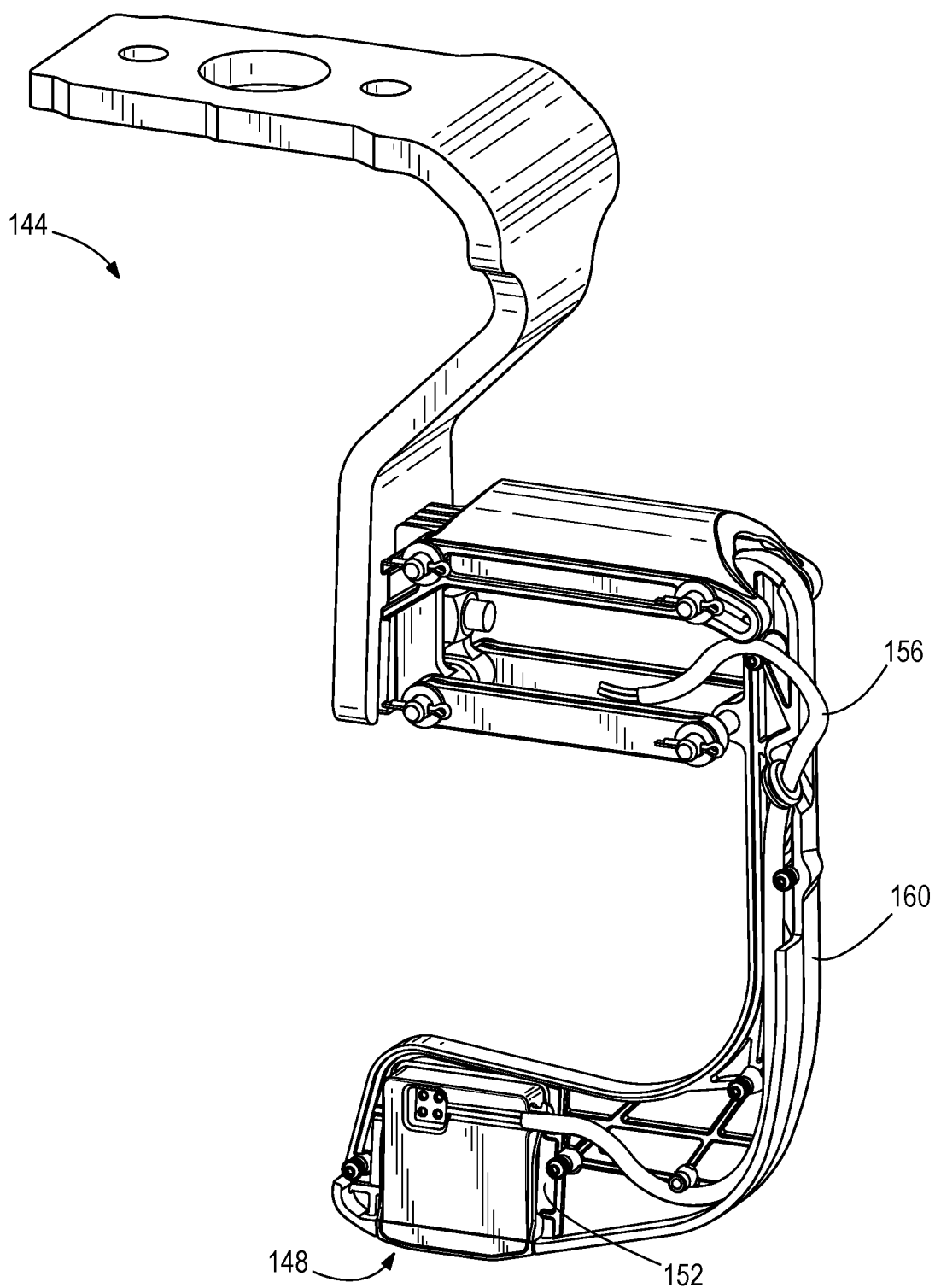
FIG. 7 is a perspective view of the seed firmer, illustrating the seed detection sensor inside of the chamber.

With reference to FIGS. 2-7, in some constructions the furrow following device 144 includes a chamber 152 (the interior of which is shown in FIG. 7) that houses at least a portion of the seed detection sensor 148. As illustrated in FIGS. 4-6, in some constructions the chamber 152 is covered by a cover or covers 154 (e.g., removable cover, coupled to the furrow following device 144 via screws or other fasteners). In the illustrated construction, at least one electrical conductor 156 (e.g., wire, wire harness) extends along the furrow following device 144 along a leg 160 of the furrow following device 144. In some constructions the electrical conductor(s) 156 provides a wired connection to a controller 164 (FIG. 2) to send a signal or signals 168 (FIG. 3) from the seed detection sensor 148 to the controller 164. In some constructions the electrical conductor(s) 156 additionally or alternatively provides a wired connection to a power source for the seed detection sensor 148.

In some constructions the chamber 152 additionally or alternatively includes a location for a battery. The battery may provide power to the seed detection sensor 148. In some constructions the chamber 152 additionally or alternatively includes a location for a wireless transmitter. The wireless transmitter sends a wireless signal or signals to the controller 164 corresponding to detection of seeds.

The controller 164 includes a receiver, transceiver, or other electronic component that receives the signal or signals from the seed detection sensor 148 corresponding to detection of seeds. The controller 164 also includes a processor or other electronic component that is configured to use the received signal or signals to determine information regarding the location and/or placement of a seed or seeds within the furrow 136. For example, in the illustrated construction the controller 164 is coupled to a display 172 (FIG. 2), which displays the location of the seed or seeds in the furrow 136 to an operator. In some constructions, one or both of the controller 164 and the display 172 are disposed remotely. In some constructions, the seed detection sensor 148 itself includes a processor or other electronic component that calculates a position of the seed or seeds in the furrow 136. In some constructions a GPS (Global Positioning System) unit is also connected to the controller 164 to enable correlation between detected seed and GPS location, whether for storing on map, in a database, or in any other form. In some constructions the controller 164 analyzes the signal or signals from the seed detection sensor 148 and determines measures of seed location and placement parameters such as seed spacing, percent good spacing, or a statistical measure of seed placement accuracy such as standard deviation of seed spacing or a coefficient of variation, etc. The display 172 may then display the measures of these seed placement parameters. Knowing the measures of such seed spacing parameters may help an operator to understand, for example, what percentage of the seeds are within a desired tolerance range for spacing. The operator may then make corrections to the seeding machine 10 as necessary based on the known measures. U.S. Patent Publication No. 2012/0004768, the entire contents of which are incorporated herein by reference, discusses various types of seed placement parameters and measures of the seed placement parameters that may be determined by the controller 164, as well as how those measures may be displayed (see, e.g., paragraphs [0013]-[0037]).

With reference to FIG. 2, in the illustrated construction the seed detection sensor 148 is an accelerometer. With reference to FIGS. 2 and 3, when the row unit 118 is in use and moving across the soil 20, the furrow following device 144 runs along the open furrow 136 and makes contact with each seed that has been dropped into the furrow 136. The furrow following device 144 applies force to each seed as it passes over the seed, firming the seed into the soil 20. As the furrow following device 144 applies the force to each seed and passes over each seed, the seed detection sensor 148 detects any movement (e.g., vertical) of the furrow following device 144 associated with traversal of the seed firmer device 144 over the seed, and generates a signal 168 that is sent to the controller 164.

FIG. 3 illustrates one example of the signal 168 generated by the seed detection sensor 148, the signal 168 having various spikes 176 (e.g., acceleration pulses) or sets of spikes that correlate to detection of seeds in the furrow 136. In some constructions, the controller 164 processes the data illustrated in FIG. 3 using a rolling range detection processing algorithm or similar threshold calculation to determine seed placement and/or spacing in the furrow 136. In some constructions the controller 164 runs calculations (e.g., combining seed presence data from the signals 168 with other known inputs such as speed, location, desired planting rates, crop type, etc.) to determine seed population, seed singulation, doubles, skips, seed spacing (e.g., the measures of seed placement parameters described above), seeds per unit time or distance, etc. In some constructions, the controller 164 uses an algorithm to find accelerations in a certain range or sensitivity, and then uses video and/or other location measurements to correlate with the acceleration pulses. In some constructions, the display 172 is configured to map and display precise locations of each seed for the operator (e.g., creating a shared agronomic map), such that the operator is aware of where to provide application of fertilizer or other chemicals during planting or later in the growing season, and/or so that the operator may determine germination rates and potentially realize other uses enabled by knowing the precise locations of seeds in the field. By way of example only, the locations of each seed in a row can be stored in a computer-readable memory that is subsequently accessed by a controller of another agricultural implement (e.g., sprayer) for selective application of material (e.g., fertilizer) in those same locations. In this manner, localized and targeted application of material can be made without widespread application in other locations along the row, thereby resulting in significant cost savings to the user. In some constructions the generation of signals and the display and mapping of the seed locations or other seed spacing information described above occurs in real time, providing immediate information to the operator during use of the seeding machine 10.

In some constructions, the seed detection sensor 148 also permits the operator to determine and analyze the smoothness and quality of the furrow 136, thereby allowing the operator to judge the quality of the furrow 136 and determine the travel speed at which the operator can be confident in planting the seeds. Diagnostics may be built into the seed detection sensor 148 and/or the controller 164 and display 172. For example, if accelerations of a certain defined level (or accelerations greater than or less than a certain defined level) are measured by the seed detection sensor 148, then the controller 164 may be configured to issue a warning (e.g., audible sound, flashing light, etc. on the display 172) to the operator that the furrow following device 144 may be malfunctioning, that the speed of the seeding machine 10 is too high, or that characteristics of the furrow 136 may be unsuitable for planting. In some constructions, the controller 164 and the seed detection sensor 148 form a closed loop for adjusting planting speed.

While the illustrated construction of the seed detection sensor 148 includes an accelerometer, other constructions of the seed detection sensor 148 include different types of sensors. For example, in some constructions the seed detection sensor 148 includes a strain gauge, an optical viewer (e.g., video camera), a temperature sensor (e.g., infrared), a magnetic sensor, a microwave, ultrasonic, or other electromagnetic wave sensor, or an impact plate coupled to the furrow following device 144 or another structure on the seeding machine 10. In some constructions the seed detection sensor 148 is a sensor that detects strain, force, temperature, color, reflectivity, and/or emissivity. For example, in some constructions the seeds are coated with various treatments and typically have a bright color, which may be detected by the seed detection sensor 148. In some constructions, the seeds have metallic material embedded or otherwise forming part of a coating on the seed. The seed detection sensor 148 in this instance may be a magnetic sensor that detects the metallic material. Similar to the accelerometer described above, each of these other types of seed detection sensors 148 may generate a signal or signals that can then be used to determine (in a precise fashion) the location of each seed in the furrow 136.

Additionally, in some constructions, more than one seed detection sensor 148 may be used. For example, and with reference to FIG. 2, in some constructions each row unit 118 includes a plurality of seed detection sensors 148, each of which generates one or more signals that are sent to the controller 164 and then processed together to determine seed location and/or spacing. In some constructions one or more of the seed detection sensors 148 are different from the other or others. For example, and as illustrated in FIG. 2, one of the seed detection sensors 148 may be an accelerometer fixed to the furrow following device 144, and another of the seed detection sensors 148 may be an optical viewer or other sensor coupled to a seed tube 180 that detects seeds as they pass along the seed tube 180 before entering the furrow 136. As another example, one of the seed detection sensors 148 may be an acceleration sensor housed in or otherwise carried by the furrow following device 144 in any of the manners discussed herein, whereas another of the seed detection sensors 148 can be another acceleration sensor, a temperature sensor, or an electromagnetic wave sensor also housed in or otherwise carried by the furrow following device 144 in any of the manners discussed herein. Other constructions include various other combinations and numbers of seed detection sensors 148.

In some constructions, the controller 164 is configured to compare one seed sensor signal (e.g., from a seed detection sensor 148 that detects seeds as they pass along the seed tube 180 as illustrated in FIG. 2) with another seed sensor signal (e.g., from a seed detection sensor 148 that is coupled to the furrow following device 144 as illustrated in FIG. 2). The controller 164 is configured to issue a warning to an operator of a furrow following device 144 and/or seed detection sensor 148 malfunction in response to measurements that do not align in accordance with a predefined level.

In some constructions, one or more of the seed detection sensors 148 may be used to detect a velocity of a seed dropped in the seed tube 180. In some circumstances two seeds may pass the seed detection sensor 148 in a brush belt cartridge or in the seed tube 180 and may appear as only a single seed to the seed detection sensor 148. A separate seed detection sensor 148 coupled to the furrow following device 144 (e.g., a seed detection sensor 148 that includes an accelerometer) helps to alleviate this error by detecting both seeds once the seeds are in the open furrow 136.

In some constructions, one or more seed detection sensors 148 are also, or alternatively, object detection sensors configured to detect objects other than seeds. For example, in some constructions at least one of the seed detection sensors 148 detects crop residue, stalks, rocks, and/or other objects within the open furrow 136. In some constructions the same seed detection sensor 148 as that described above (i.e., the seed detection sensor 148 that includes an accelerometer in the furrow following device 144) may be used to detect the other objects. In yet other constructions the seed detection sensor 148 that senses objects other than seeds includes a strain gauge, an optical viewer (e.g., video camera), a temperature sensor (e.g., infrared), a magnetic sensor, a microwave, ultrasonic, or other electromagnetic wave sensor, or an impact plate. In additional constructions at least one of the seed detection sensors 148 that detects objects other than seeds is a reflective optical sensor (or other optical sensor) that is disposed on the furrow following device 144. As an example, objects in the open furrow 136 may have a color that differs from the surrounding soil 20, and that color difference can be sensed by a sensor 148.

Although each of the above-referenced sensors 148 can be positioned on or within the furrow following device 144, in some constructions the seed detection sensor 148 that senses objects other than seeds is positioned at a location on the row unit 118 other than on or within the furrow following device 144 (e.g., on the seed tube 180, on the row unit sub-frame 130, etc.) or on another component of the row unit 118 (e.g., a brush belt cartridge).

In some constructions the controller 164 receives one or more signals that are sent to the controller 164 from the seed detection sensor or sensors 148 and then processes the signals together to map locations of these objects (e.g., seeds, field residue, stalks, rocks, etc.) or otherwise determine a quantity of these objects. For example, in some constructions the controller 164 may determine a number of residue pieces per number of feet of travel (e.g., a number of residue pieces per 10 feet of travel), or some other density or percentage of the objects as compared to the surrounding field (e.g., the number of objects in a given area of the field or along a given length of a furrow in the field). In some constructions the operator may use this information to change the aggressiveness of a row cleaner (i.e., so as to clean out the furrow 136 and remove the objects). In some constructions the information described above may help an operator to determine the impact of residue pieces on the overall yield of the crop. For example, an operator may be able to determine that one area of a field included a significant amount of reside and lower yield as compared to a different area of the field. In some constructions the controller 164 then uses the mapping to control one or more other features on the seeding machine 10 such as row cleaner settings, etc.

Various features and advantages of the disclosure are set forth in the following claims.

What is claimed is:

1. A seeding machine comprising:
   a main frame;
   a row unit coupled to the main frame, the row unit having a row unit sub-frame and a furrow following device coupled to the row unit sub-frame; and
   a seed detection sensor coupled to the furrow following device, wherein the seed detection sensor is an accelerometer configured to detect seed position within an open furrow.

2. The seeding machine of claim 1, further comprising a controller, wherein the seed detection sensor is configured to send one or more signals to the controller corresponding to detection of seeds, and wherein the controller is configured to determine the seed position based on the one or more signals.

3. The seeding machine of claim 2, wherein the one or more signals are acceleration pulses.

4. The seeding machine of claim 2, further comprising a display coupled to the controller, wherein the display is configured to display information regarding seed placement within a field.

5. The seeding machine of claim 2, wherein the furrow following device is a seed firmer, and wherein the controller is configured to issue a warning to an operator of at least one of an indication of seed firmer malfunction, an indication that the speed of the seeding machine is too high, or an indication that furrow characteristics may be unsuitable for planting, in response to measurement by the seed detection sensor of accelerations greater than a predefined level.

6. The seeding machine of claim 1, wherein the seed detection sensor is a first seed detection sensor, and wherein a second seed detection sensor is coupled to the row unit.

7. The seeding machine of claim 6, wherein the first seed detection sensor is a first type of seed detection sensor, and wherein the second seed detection sensor is a second, different type of seed detection sensor.

8. A seeding machine comprising:
   a main frame;
   a row unit coupled to the main frame, the row unit having a row unit sub-frame and a seed firmer coupled to the row unit sub-frame; and
   an accelerometer coupled to the seed firmer, wherein the accelerometer is configured to detect seed position within an open furrow.

9. The seeding machine of claim 8, further comprising a controller, wherein the seed detection sensor is configured to send one or more signals to the controller corresponding to detection of seeds, and wherein the controller is configured to determine the seed position based on the one or more signals.

10. The seeding machine of claim 9, further comprising a display coupled to the controller, wherein the display is configured to display information regarding seed placement within a field.

11. The seeding machine of claim 9, wherein the controller is configured to issue a warning to an operator of at least one of an indication of a seed firmer malfunction, an indication that the speed of the seeding machine is too high, or an indication that furrow characteristics may be unsuitable for planting, in response to measurement by the seed detection sensor of accelerations greater than a predefined level.

12. The seeding machine of claim 8, wherein the seed detection sensor is a first seed detection sensor, and wherein a second seed detection sensor is coupled to the row unit.

13. The seeding machine of claim 12, wherein the first seed detection sensor is a first type of seed detection sensor, and wherein the second seed detection sensor is a second, different type of seed detection sensor.

14. The seeding machine of claim 8, wherein the row unit is a first row unit, and wherein a second row unit is coupled to the main frame.

15. A seeding machine comprising:
   a main frame;
   a row unit coupled to the main frame, the row unit having a row unit sub-frame and a seed firmer coupled to the row unit sub-frame;
   a seed detection sensor coupled to the seed firmer, wherein the seed detection sensor is an accelerometer; and
   a controller coupled to the seed detection sensor, wherein the controller is configured to determine seed position at least partially based on one or more signals received from the seed detection sensor, and wherein the controller is configured to issue a warning to an operator of a seed firmer malfunction in response to measurement by the seed detection sensor of an acceleration greater than a predefined level.

16. The seeding machine of claim 15, further comprising a display coupled to the controller, wherein the display is configured to display information regarding seed placement within a field.

17. A seeding machine comprising:
   a main frame;
   a row unit coupled to the main frame, the row unit having a row unit sub-frame and a seed firmer coupled to the row unit sub-frame, the seed firmer including a chamber, and a cover that covers that chamber; and
   a seed detection sensor coupled to the seed firmer at least partially within the chamber, wherein the seed detection sensor is an accelerometer configured to detect seed position within an open furrow.

18. The seeding machine of claim 17, further comprising a controller, and at least one electrical conductor coupled to both the seed detection sensor and the controller.

19. The seeding machine of claim 17, further comprising a controller, wherein the seed detection sensor is configured to send a wireless signal or signals to the controller.

\* \* \* \* \*